US011855840B2

(12) United States Patent
Pingale et al.

(10) Patent No.: US 11,855,840 B2
(45) Date of Patent: Dec. 26, 2023

(54) SMART ZERO-TOUCH PROVISIONING (ZTP)

(71) Applicant: HEWLETT PACKARD ENTERPRISE DEVELOPMENT LP, Houston, TX (US)

(72) Inventors: Amit Pingale, Santa Clara, CA (US); Shabaresha Hemaraju, Santa Clara, CA (US); Rishabh Upadhyay, Santa Clara, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 20 days.

(21) Appl. No.: 17/515,429

(22) Filed: Oct. 30, 2021

(65) Prior Publication Data

US 2023/0136943 A1    May 4, 2023

(51) Int. Cl.
*H04L 41/0806* (2022.01)
*H04L 9/40* (2022.01)
*H04L 41/12* (2022.01)
*H04L 12/66* (2006.01)
*H04L 45/00* (2022.01)

(52) U.S. Cl.
CPC .......... *H04L 41/0806* (2013.01); *H04L 12/66* (2013.01); *H04L 41/12* (2013.01); *H04L 45/563* (2013.01); *H04L 63/0471* (2013.01)

(58) Field of Classification Search
CPC ........ H04L 12/283–2834; H04L 12/66; H04L 41/0806–0809; H04L 41/0886; H04L 41/12–122; H04L 45/02–04; H04L 63/0471; H04L 65/102–1043; H04L 41/0803; H04L 45/56–563
See application file for complete search history.

(56) References Cited

U.S. PATENT DOCUMENTS

| | | | |
|---|---|---|---|
| 6,434,618 B1* | 8/2002 | Cohen | H04L 47/2483 709/227 |
| 6,917,977 B2 | 7/2005 | White et al. | |
| 9,198,121 B2* | 11/2015 | Alon | H04W 24/00 |
| 9,325,575 B2* | 4/2016 | Gray | H04L 41/0806 |
| 10,034,118 B2* | 7/2018 | Goluboff | H04L 63/083 |
| 10,291,477 B1* | 5/2019 | Askar | H04W 4/50 |

(Continued)

FOREIGN PATENT DOCUMENTS

EP    2033082    3/2009

OTHER PUBLICATIONS

Aruba SD-Branch Overview; Aruba SD-branch overview; Assignee: Hewlett Packard enterprises; Published: Jun. 2018, Retrieved Aug. 3, 2021, 11 Pgs.

*Primary Examiner* — Brendan Y Higa
(74) *Attorney, Agent, or Firm* — Sheppard Mullin Richter & Hampton LLP

(57) ABSTRACT

Systems and methods are provided for configuring a plurality of network devices to connect to a cloud-based provisioning system via a single web socket connection. The connection may be established between the provisioning system and a first gateway that serves as the entry point to the Internet from a branch office. Other network devices may connect to this first gateway, including such as routers, switches, access points, and second gateways. The single web socket connection can dramatically reduce the number of connections that need to be established with the cloud-based provisioning system.

20 Claims, 6 Drawing Sheets

(56) References Cited

U.S. PATENT DOCUMENTS

| | | | | |
|---|---|---|---|---|
| 10,812,454 | B2* | 10/2020 | Jalkanen | H04L 63/0428 |
| 10,819,679 | B2* | 10/2020 | Peng | H04L 61/5076 |
| 10,855,829 | B2 | 12/2020 | Gray et al. | |
| 11,464,073 | B2* | 10/2022 | Prabhakar | H04W 24/02 |
| 2012/0219007 | A1* | 8/2012 | Cho | H04L 12/2825 |
| | | | | 370/401 |
| 2012/0238306 | A1* | 9/2012 | Evers | H04W 88/06 |
| | | | | 455/515 |
| 2013/0215776 | A1* | 8/2013 | Verpooten | H04L 1/18 |
| | | | | 370/252 |
| 2016/0094387 | A1* | 3/2016 | Stephenson | H04L 63/0823 |
| | | | | 709/222 |
| 2017/0272317 | A1* | 9/2017 | Singla | H04W 12/06 |
| 2018/0034698 | A1* | 2/2018 | Perez | H04L 41/0886 |
| 2018/0109650 | A1* | 4/2018 | Berdy | H04L 63/123 |
| 2018/0376317 | A1* | 12/2018 | Kim | H04L 69/24 |
| 2020/0044917 | A1* | 2/2020 | Peng | H04L 41/0803 |
| 2020/0076902 | A1* | 3/2020 | Huang | H04L 67/141 |
| 2021/0377109 | A1* | 12/2021 | Shrivastava | H04L 12/4625 |
| 2022/0217057 | A1* | 7/2022 | Schumaker | H04L 41/20 |
| 2022/0353147 | A1* | 11/2022 | Kurmala | H04L 12/4675 |

* cited by examiner

SMART ZERO-TOUCH PROVISIONING (ZTP)

BACKGROUND

Various devices allow data packets in a computer network to move from one device to another, including routers, switches, access points, and gateways. A router is a networking device that routes data packets between different Internet Protocol (IP) networks at the network layer (layer 3) of the open systems interconnection (OSI) model. A switch is networking device that uses a media access control (MAC) address to forward data at the data link layer (layer 2) of the OSI model. An access point (AP) is a networking device that is connected directly to a wired local area network (e.g., Ethernet) and provides wireless connections (e.g., using wireless LAN technology or Wi-Fi) for other devices to use that wired connection. A gateway is a networking device that allows data to flow from one discrete network to another. Gateways are distinct from routers or switches in that they communicate using more than one protocol to connect multiple networks and can operate at any of the seven layers of the OSI model.

A computer network may implement each of these devices through a provisioning process. For example, a network administrator may connect to each of these devices and provide provisioning and routing information so that the devices may communicate with each other via the network. However, when the network becomes very large, manual provisioning becomes nearly impossible. Better methods are needed.

BRIEF DESCRIPTION OF THE DRAWINGS

The present disclosure, in accordance with one or more various examples, is described in detail with reference to the following figures. The figures are provided for purposes of illustration only and merely depict typical examples.

Figure 1:
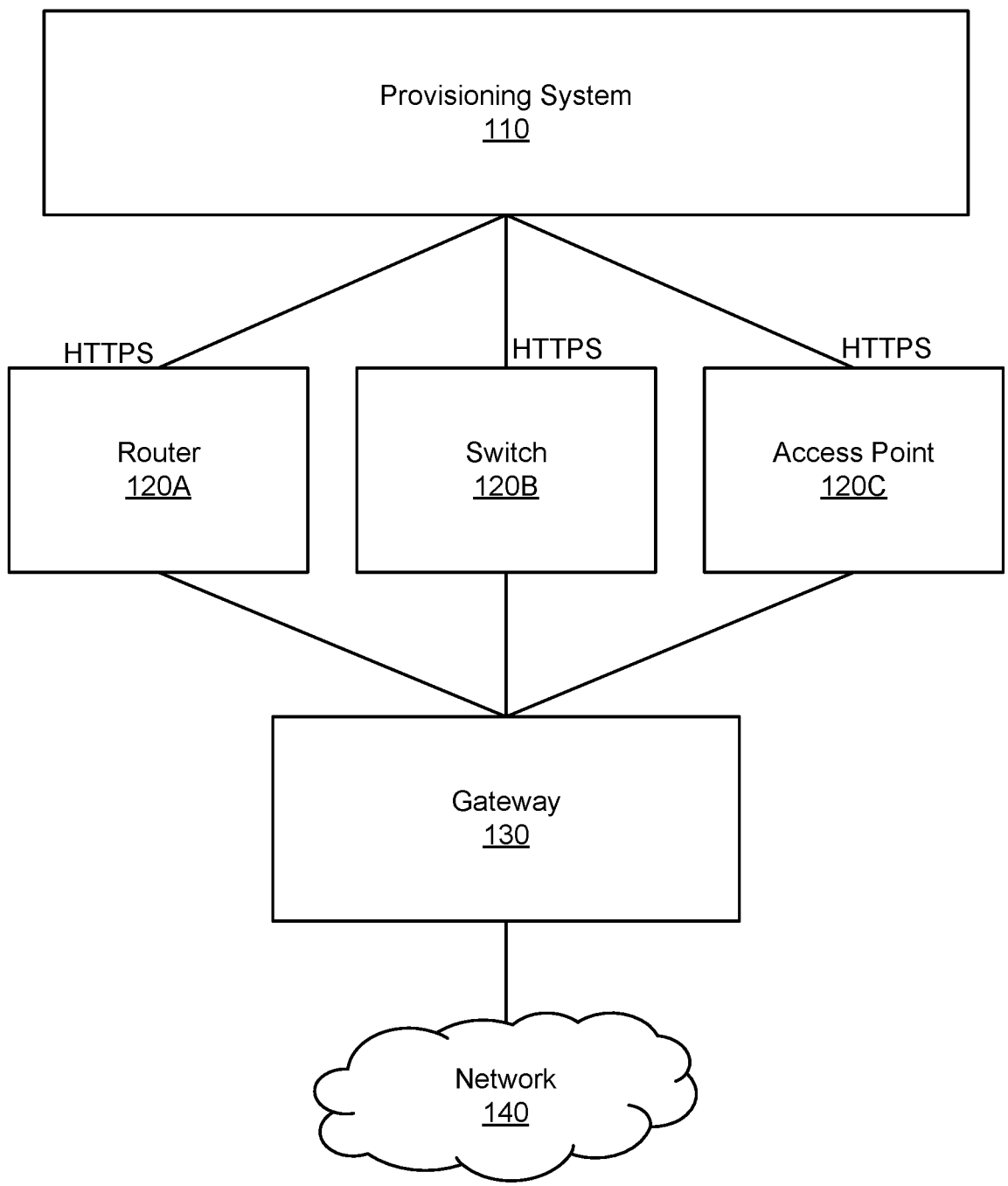
FIG. 1 illustrates an environment in accordance with some examples of the application.

The figures are not exhaustive and do not limit the present disclosure to the precise form disclosed.

DETAILED DESCRIPTION

In some networks, a network provisioning process is implemented. Network provisioning can allow authorized users, devices, and servers to access other devices on the network by downloading configurations and complying with connectivity and security requirements.

This provisioning process is generally performed separately by each device. For example, the routers, switches, and gateways (and any other devices that are co-located with these devices at a physical location) may connect to a central provisioning system separately by establishing individual secure network connections (e.g., hypertext transfer protocol secure (HTTPS) web socket) to the provisioning system. Once connected, the devices can download their configurations. As illustrative examples, downloading configurations may include various parameters on the device (e.g., internet protocol (IP) address, Ethernet, or Wi-Fi settings) or downloading and/or installing software (e.g., installation folders, device drivers, partitioning settings, setup tools, enterprise software, firmware, or applications).

Once the devices have downloaded the parameters from the central provisioning system, the devices can connect to a network (e.g., a secure enterprise network, the Internet, or a cloud network) via the gateway. For example, when the devices are access points and have downloaded the parameters from the central provisioning system, the access points can provide a WiFi connection for other devices to connect to the network. In another example, when the devices are switches and have downloaded the parameters from the central provisioning system, the switches can provide a wired connection for other devices to connect to the network.

When the provisioning system is implemented in the cloud, several individual HTTPS connections to the cloud are established. As such, the network devices that are co-located with the gateway connect to a cloud-based provisioning system using separate network connections to download their configurations, many of which may be similar based on being located in a shared location.

Examples of the disclosure allow network devices to connect to a cloud-based provisioning system (e.g., a central device that provides provisioning and routing information so that the devices may communicate with each other and access a public or private network) via a single secure connection (e.g., a web socket connection or hypertext transfer protocol secure (HTTPS) web socket). The connection may be established between the provisioning system and a first gateway that serves as the entry point to the Internet from a branch office. Other network devices may also connect to this first gateway, including routers, switches, access points, second gateways, or any other networking device. When each of the network devices connect via a single web socket connection, the combined network paths can dramatically reduce the number of connections that are received (e.g., established with) the cloud-based provisioning system.

The connection process may begin with a network device (e.g., switch or AP) sending a discovery message to the first gateway. The first gateway may respond with its IP address. Upon receiving the IP address of the first gateway, the network device refrains from attempts to establish its own individual connection to the cloud-based provisioning system, and instead relies on the existing connection between the first gateway and the cloud. The network device can then request its configuration from the cloud-based provisioning system via the first gateway, or more specifically, via the first gateway existing secure connection to the cloud-based provisioning system. If, on the other hand, the first gateway is not discovered, the network device initiates its own individual connection to the cloud-based provisioning system.

Various technical issues are solved by this disclosure. In traditional systems, a network administrator may manually connect to each of these devices to provide the configurations or software. When the network becomes very large, manual provisioning becomes nearly impossible. These traditional systems may be improved to allow various network devices to communicate with each other and allow the network devices to download their configurations (e.g., internet protocol (IP) address, Ethernet, or Wi-Fi settings) or software (e.g., installation folders, device drivers, partitioning settings, setup tools, enterprise software, or applications) through a shared provisioning process.

Technical improvements are realized throughout the application. By leveraging the connection with the gateway, the improved communication process may reduce the number of electronic messages that are transmitted via the network to the cloud-based provisioning system. This may help limit electronic communications directed to provisioning the network devices using multiple communication paths, and direct the communications between a single network path between a branch gateway and network devices, rather than multiple network paths between each of the network devices and the provisioning system. This can decrease network traffic in the communication network overall and allow more bandwidth usage for other data packets. The improved communication process may also reduce an overall processing load on a cloud network, including the cloud-based provisioning system, which can allow the cloud network to provide faster response times for other processing tasks.

FIG. 1 illustrates an environment in accordance with some examples of the application. In this illustration, provisioning system 110, plurality of network devices 120 (illustrated as router 120A, switch 120B, and access point 120C), gateway 130, and network 140. Other network devices 120 or configurations may be implemented without diverting from the scope of the disclosure.

Each of the devices in the network may connect to each other after interacting with provisioning system 110. The provisioning process may be initiated by establishing a secure connection with provisioning system 110.

Provisioning system 110 may enable services for other devices in the network. For example, provisioning system can initiate a configuration process and provide authentication credentials for network configuration, routing configuration, or WiFi configuration. Once the credentials are installed, the configuration process may allow plurality of network devices 120 to connect to the cloud or other devices via network 140. Provisioning system 110 may also provide troubleshooting or monitoring processes to solve connection issues or other problems that arise for devices on network 140.

In some examples, provisioning system 110 may provide on-demand self-service to allow end users to obtain and remove cloud services (e.g., applications, or any infrastructure supporting the applications or configuration parameters) without requiring the assistance of an administrative user.

Plurality of network devices 120 may comprise one or more electronic devices that capable of connecting to one or more networks, but may need to be provisioned with parameters in order to connect to the networks. Plurality of network devices 120 may include, for example, routers, switches, access points, and gateways that comprise one or more hardware processors and machine-readable storage medium. For example, APs can refer to a network device that allows a wireless-compliant device, such as a client device or station (STA), to connect to a wired network. Additional details describing the components of plurality of network devices 120 is provided with FIGS. 4-6.

Gateway 130 may be a specific type of network device 120 that provides a network connection to a network for other network devices. In some examples, gateway 130 may provide a network connection to one or more downstream gateways or other network devices 120.

In some examples, gateway 130 is a branch gateway or gateway AP (GAP) (used interchangeably). The branch gateway can be a WAN-facing gateway in a SD-WAN or micro-branch deployment. In some micro branch deployments, there is no need for a dedicated gateway device like gateway 130. Additional APs may be added "under" the branch gateway to extend wireless coverage in a micro branch deployment. In some examples, gateway 130 can refer to an AP or other network device that has network address translation (NAT) routing and dynamic host control protocol (DHCP) server capabilities.

In some examples, branch gateway "owns" the public IP address, provides gateway/gateway-similar functionality (e.g., DHCP, NAT, or routing capabilities), and may further host a virtual private network (VPN) client for providing secure connectivity to a remote (e.g., a main office) data center or other cloud service(s) based on the needs of the micro branch. Configuration between the branch gateway of a micro branch deployment and any additional APs are typically different because their respective roles in a micro branch deployment differ.

In some examples, there is no need for a dedicated gateway. Instead, a branch gateway (e.g., or another network device acting as a gateway) acts as a WAN-facing gateway in an SD-WAN or micro-branch deployment and may be connected over an Ethernet connection (Eth-0) via a WAN port of the branch gateway. A first AP may be operatively connected to the branch gateway, and in turn, a second AP may be operatively connected to the first AP (e.g., the first and second APs are daisy chained to the branch gateway). These implementation details are provided for illustrative purposes only and should not be limiting to the disclosure.

Network 140 may comprise two or more communicatively coupled network devices that are coupled using a wired or wireless connections. The devices may communicate using one or more layers of the OSI model and may consist of private or public networks linked by a broad array of electronic, wireless, and optical networking technologies. Additional details describing network 140 is provided with FIG. 6.

During a provisioning process, each of the plurality of network devices 120 may individually connect to provisioning system 110 to download parameters. For example, plurality of network devices 120 may each download parameters associated with the device (e.g., IP address, Ethernet, or Wi-Fi settings), folder layout, or rules.

The folder layout can allow network devices to be grouped based on common provisioning scenarios. Each folder may contain one or more rules. A single folder may be associated with each management platform or group policy. In some examples, groups of folders may be created for different network device types or branch office locations and then subfolders with independent provisioning rules may be stored under higher-level folders.

The rules may correspond to when and how to supply provisioning information to network devices. The rules may also identify automatic assignment of network devices to folders and/or identify events that will trigger alert notifications to the network devices 120.

An illustrative provisioning rule type may include an instruction for the network device 120 to connect to provisioning server 110 with group information and a shared secret. Provisioning server 110 may use the group information to segregate network device 120 into configuration and reporting groups. The shared secret may act as a trust mechanism between the network device and provisioning server 110. In some examples, the group information may also identify gateway 130 as a connection point to network 140.

Once the parameters have been downloaded, the plurality of network devices 120 may install the parameters and execute the downloaded rules it received individually from provisioning server 110. The plurality of network devices 120 may also connect to network 140 via gateway 130.

Figure 2:
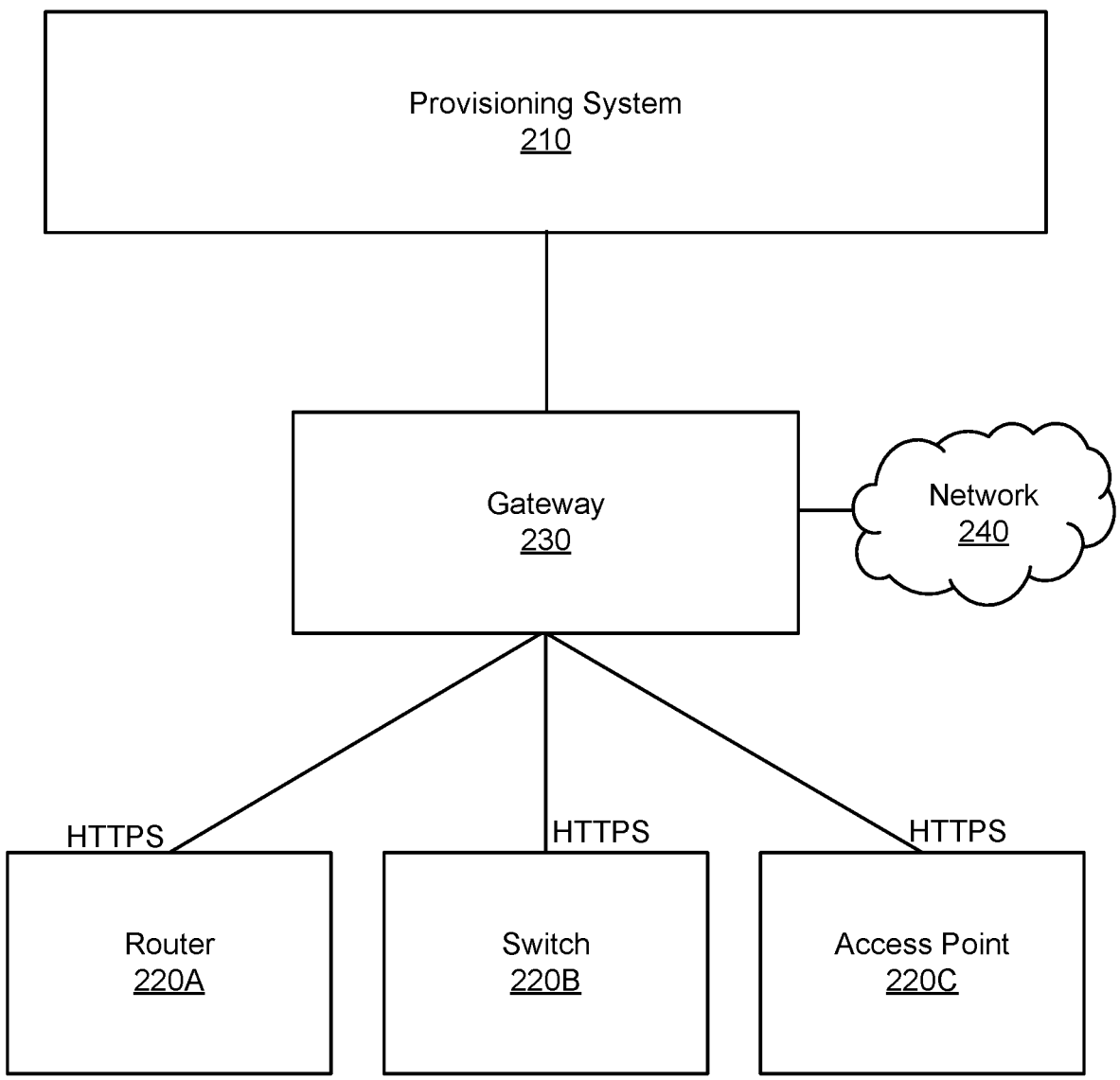
FIG. 2 illustrates an another/alternative example system environment in accordance with some examples of the application.

FIG. 2 illustrates an another/alternative example system environment in accordance with some examples of the application. In this illustration, provisioning system 210, plurality of network devices 220 (illustrated as router 220A, switch 220B, and access point 220C), gateway 230, and network 240. Other network devices 220 or configurations may be implemented without diverting from the scope of the disclosure.

Figure 3:
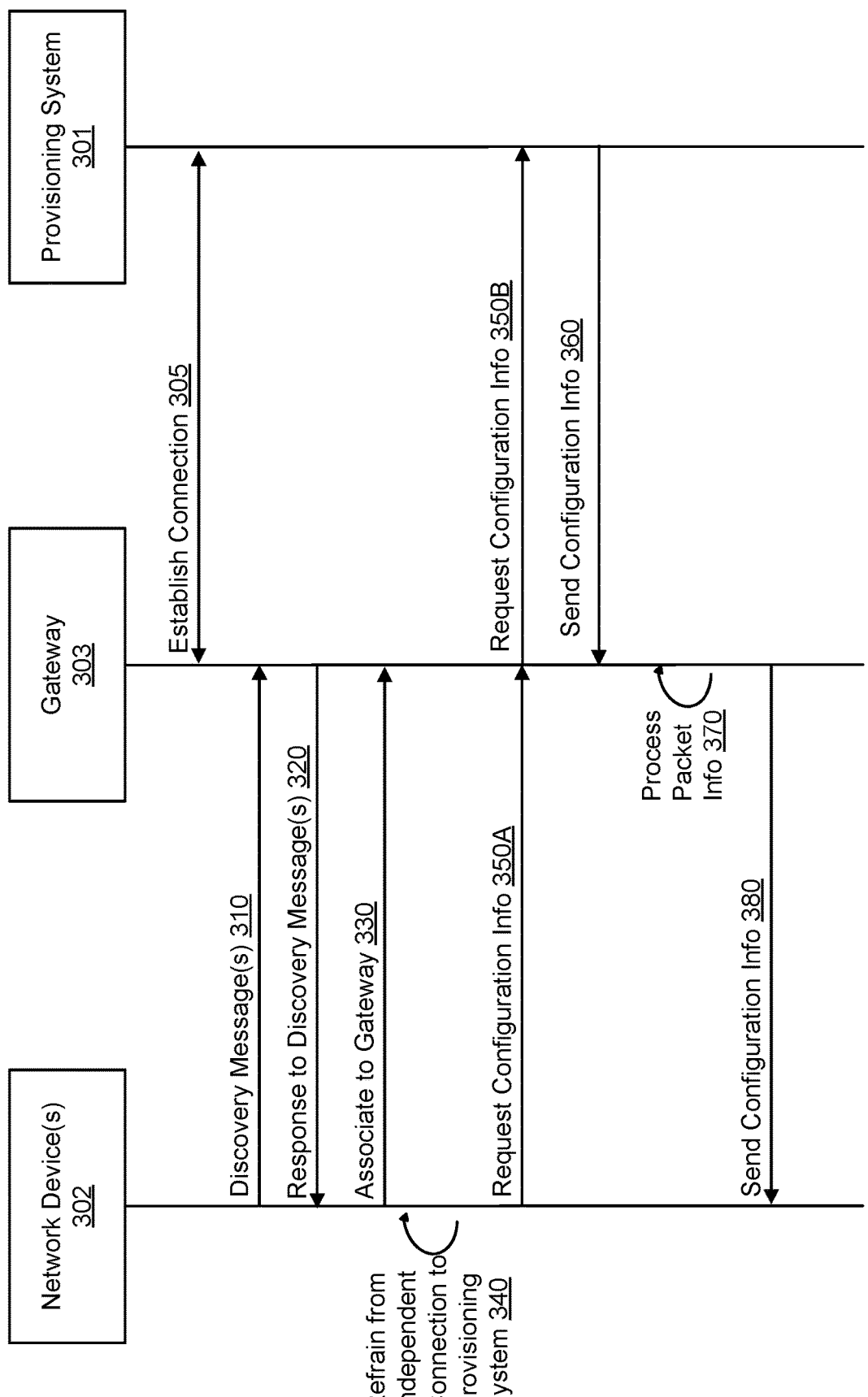
FIG. 3 illustrates a configuration process in accordance with some examples of the application.

Provisioning system 210, plurality of network devices 220, gateway 230, and network 240 may be similar devices to provisioning system 110, plurality of network devices 120 (illustrated as router 120A, switch 120B, and access point 120C), gateway 130, and network 140 as illustrated in FIG. 1, respectively, except and that they are configured to perform a provisioning process as illustrated in FIG. 3.

FIG. 3 illustrates the provisioning process in accordance with some examples of the application. Provisioning system 301, plurality of network devices 302, and gateway 303 may be similar devices to provisioning system 210, plurality of network devices 220, and gateway 230 as illustrated in FIG. 2, respectively, as well as provisioning system 110, plurality of network devices 120, and gateway 130 as illustrated in FIG. 1, respectively.

At block 305, gateway 303 may establish a connection with provisioning system 301. For example, gateway 303 may establish an individual secure network connection to provisioning system 301. Once connected, gateway 303 can download its configurations (e.g., an internet protocol (IP) address, DNS settings, IP address mask, or any other Ethernet or Wi-Fi settings) or software (e.g., that can run locally at gateway 303, including installation folders, device drivers, partitioning settings, setup tools, enterprise software, firmware, or applications).

In some examples, the secure network connection is a web socket connection. The web socket connection may correspond with a communications protocol that establishes a persistent, bi-directional, full duplex Transmission Control Protocol (TCP) connection from gateway 303 to provisioning system 301. The web socket connection may be initiated by sending a handshake request from a HTTP connection of gateway 303 to provisioning system 301. By acknowledging or accepting the handshake request, the HTTP connection may be upgraded to a web socket connection or HTTPS connection or other connection type providing a necessary level of security.

At block 310, a first network device of a plurality of network devices 302 may transmit (e.g., broadcast) a discovery message to gateway 303 via a first network connection. The first network device 302 may comprise any combination of the disclosed network devices, including but not limited to a router, switch, access point, or second gateway (different than gateway 230).

In some examples, first network device 302 may comply with Dynamic Host Configuration Protocol (DHCP). DHCP may correspond with a network management protocol used on IP networks for automatically assigning IP addresses and other network configuration parameters to devices connected to the network using a client-server architecture. DHCP may eliminate the need for individually configuring network devices manually (e.g., a network administrator logging into each network device to provide an IP address). DHCP may consist of two network components, including a centrally installed network DHCP server (e.g., provisioning system 301, gateway, router, or other capable devices) and one or more client instances of the protocol stack on each computer or device (e.g., first network device 302). When connected to the network, and periodically thereafter, the network clients may request a set of parameters from the DHCP server using the DHCP protocol.

In some examples, using DHCP, first network device 302 broadcasts a discovery message on the network subnet using the destination address (limited broadcast) or the specific subnet broadcast address (directed broadcast). Gateway 303 may receive the broadcast from first network device 302.

The broadcast may be transmitted to all network devices co-located with network device 302. The co-located devices, as used herein, refer to network devices located on the same physical or virtual network, which may be within a same physical locality or a subnet.

The co-location of the network devices may be limited to a threshold distance between the network devices that can receive the broadcast signal (e.g., distance within a structure that does not block the signal, or a predetermined distance like 100 feet). In some examples, each of the network devices may be associated with a single branch entity with similar parameter (e.g., a single gateway 303 or access point, or a single site, location, or office) to connect to a shared network.

The discovery message may comprise various information that first network device 302 can use to identify itself to gateway 303. This may include, for example, an identifier of the first network device 302. For example, gateway 303 may respond with its IP address. Upon receiving the IP address of gateway 303, first network device 302 refrains from attempts to establish its own individual connection to provisioning system 301, and instead relies on the existing connection between gateway 303 and provisioning system 301. First network device 302 may direct the outgoing provisioning request to the IP address associated with gateway 303 rather than the IP address associated with provisioning system 301.

In some examples, the first network device of 302 the plurality of network devices 302 may not have an existing connection to cloud-based services, including cloud-based provisioning system 301. As such, the first network device may be a new device to that has not previously connected to the network.

At block 320, gateway 303 may respond to the discovery message from first network device 302. For example, the discovery message may comprise Internet Control Message Protocol (ICMP) messages or any other communication between two network devices to discover the presence and location of a gateway. The response may include various information that gateway 303 may use to identify itself to the first network device 302. This may include, for example, an IP address of gateway 303.

At block 330, first network device 302 may associate with gateway 303. The association process may identify a next device for first network device 302 to send data packets in the network. For example, first network device 302 may associate with gateway 303 by inheriting and updating configurations that are stored locally at first network device 302, in order to identify the next device to send data packets. By associating with gateway 303, first network device 302 does not need to rebroadcast or rediscover devices each time it wants to send data in the network (e.g., using the DHCP discovery process).

At block 340, first network device 302 may refrain from establishing an independent connection to provisioning system 301. In other words, the first network device initially attempts to connect to cloud-based services and, when it identifies that it can connect to gateway 303, may stop trying to connect to the cloud-based services. In some examples, upon receiving the IP address of gateway 303, the first network device ceases attempts to establish its own individual connection to provisioning system 301, and instead relies on the existing connection between the gateway 303 and provisioning system 301.

If the connection drops, the devices may remain connected using the stored IP address and other configuration information. The devices may not be disassociated with each other until they are released under DHCP. For example, first network device 302 may send a request to provisioning system 301 or gateway 303 to release the DHCP information and deactivate the IP address of first network device 302. First network device 302 may transmit the discovery message next time it wants to connect to the network.

At block 350, network device 302 may request configuration information from gateway 303. As illustrated, network device 302 may request configuration information from gateway 303 at block 350A and gateway 303 may forward the request for configuration information to provisioning system 301 at block 350B.

In some examples, network device 302 can request its configuration information from the provisioning system 301 via gateway 303, or more specifically, via the existing secure connection between gateway 303 and provisioning system 301. On the other hand, if gateway 303 is not discovered by network device 302 within a threshold period of time (e.g., one minute), network device 302 may initiate its own individual connection to provisioning system 301.

At block 360, provisioning system 301 may send configuration information back to gateway 303. For example, the configuration information may include network configurations or a link to software. Network device 302 may download the software from the link included with the configuration information.

At block 370, gateway 303 may process the configuration information. For example, when the configuration information is received in an encrypted format, gateway 303 may decrypt the packet information on behalf of network device 302. When the independent connection between network device 302, gateway 303, and provisioning system 301 is established, the data packets may be decrypted at gateway 303. When the independent connection between network device 302, gateway 303, and provisioning system 301 is not established (e.g., when network device 302 and provisioning system 301 directly communicate for provisioning information), the data packets may be decrypted at network device 302.

At block 380, gateway 303 may send configuration information to network device 302. As illustrative examples, the configuration information may include network configurations or a link to software. Network device 302 may download the software from the link included with the configuration information.

For simplicity of explanation, the illustrative example discussed herein has been limited to a single network device from plurality of network devices 302. The disclosure should not be limited to a single network device and a person with reasonable skill in the art may identify that additional network devices may also establish this association with gateway 303 using additional discovery message processes.

As an illustrative example, additional network devices from plurality of network devices 302 may each broadcast a discovery message to gateway 303. For example, a second network device from plurality of network devices 302 may broadcast a second discovery message to gateway 303. Gateway 303 may respond to the second discovery message from second network device from plurality of network devices 302, so that second network device can also refrain from establishing an independent connection to provisioning system 301. Second network device may request configuration information from gateway 303, which it forwards to provisioning system 301 using the same secure connection it used when connecting to provisioning system 301 for the first network device of the plurality of network devices 302. Provisioning system 301 may send the configuration information back to gateway 303 (e.g., via the same secure connection), gateway 303 may process the configuration information (e.g., decrypting packets comprising the second configuration information) and route the decrypted packets comprising the second configuration information to the second network device. In some examples, the process of decrypting individual packet information from a plurality of network device 302 may be performed in parallel with decrypting the packets comprising the first configuration information.

In some examples, prior to block 305, the plurality of network devices 302 may select a particular network device from plurality of network devices 302 to identify as gateway 303. For example, plurality of network devices 302 (e.g., gateways, switches, or APs) communicate with each other and determine that they are co-located at the same branch (e.g., within a threshold distance such that the devices can receive the network signal from each other, communicatively coupled to a subset of access points, switches, or gateways). Once plurality of network devices 302 identify that they are co-located, a unique identifier may be generated for the plurality of network devices 302 to select a particular network device to act as gateway 303 (e.g., or as the GAP). Gateway 303 alone may contact the cloud system using the unique identifier, yet the device may not be limited to an actual gateway hardware device. This may help avoid multiple connections to provisioning system 301 from multiple devices within the plurality of network devices 302, while also establishing a single point of communication with provisioning system 301, debugging an error, and the like. On the cloud side, a branch configuration is provided that allows for configuring (e.g., at a branch level) all network devices that are co-located at a same branch or location.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 4:
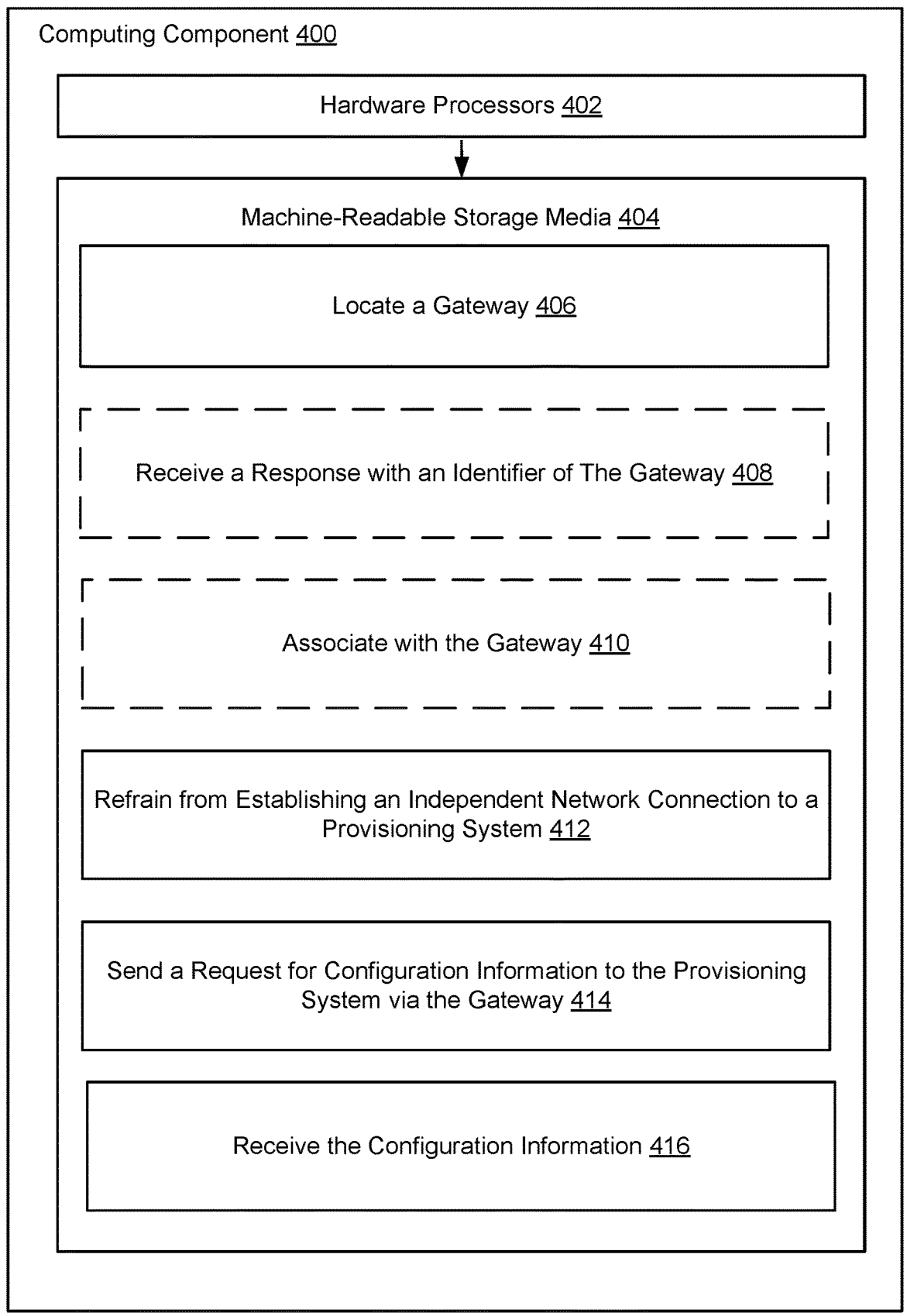
FIG. 4 is an example computing component that may be used to implement various features of examples described in the present disclosure.

FIG. 4 illustrates an example computing component that may be used to implement gateway zero-touch provisioning (ZTP) in accordance with various examples. Referring now to FIG. 4, computing component 400 may be, for example, a server computer, a controller, or any other similar computing component capable of processing data. In the example implementation of FIG. 4, the computing component 400 includes a hardware processor 402, and machine-readable storage medium for 404.

Hardware processor 402 may be one or more central processing units (CPUs), semiconductor-based microprocessors, and/or other hardware devices suitable for retrieval and execution of instructions stored in machine-readable storage medium 404. Hardware processor 402 may fetch, decode, and execute instructions, such as instructions 406-416, to control processes or operations for provisioning network devices. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-416.

Hardware processor 402 may execute instruction 406 to locate a gateway. For example, network device 220 may broadcast a discovery message to locate gateway 230 that is co-located with network device 220. A network connection may exist between gateway 230 and a cloud-based provisioning system, like provisioning system 210.

In some examples, hardware processor 402 may execute instruction 408 to receive a response with an identifier of the gateway. For example, network device 220 may receive a response to the discovery message, where the response includes an identifier of gateway 230.

In some examples, hardware processor 402 may execute instruction 410 to associate with the gateway. For example, network device 220 may associate with gateway 230 using the identifier of the gateway.

Hardware processor 402 may execute instruction 412 to refrain from establishing an independent network connection to a provisioning system. For example, network device 220 may determine to refrain from establishing an independent network connection to the cloud-based provisioning system. The determination to refrain from establishing an independent network connection may be based on the existing network connection between the gateway and the cloud-based provisioning system.

Hardware processor 402 may execute instruction 414 to send a request for configuration information to the provisioning system via the gateway. For example, network device 220 may send a request for configuration information for the network device to the cloud-based provisioning system via the existing network connection between the gateway and the cloud-based provisioning system.

Hardware processor 402 may execute instruction 416 to receive the configuration information from the cloud-based provisioning system via the gateway. In some examples, network device 220 may receive packets comprising the configuration information from provisioning system 210 that network device 220 can install locally in order to connect to network 240.

Figure 5:
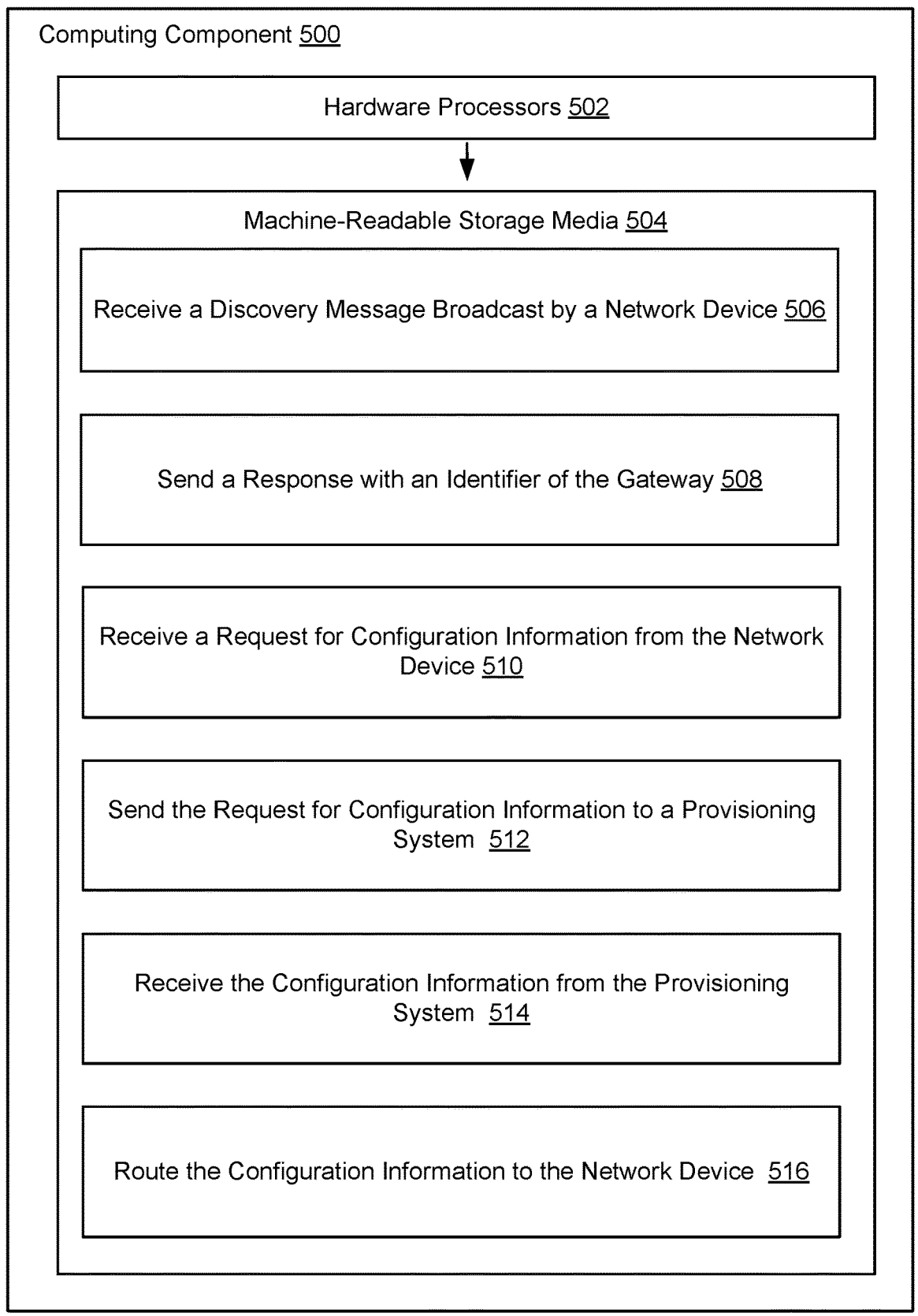
FIG. 5 is an example computing component that may be used to implement various features of examples described in the present disclosure.

FIG. 5 illustrates an example computing component that may be used to implement gateway zero-touch provisioning (ZTP) in accordance with various examples. Referring now to FIG. 5, computing component 500 may be, for example, a server computer, a controller, or any other similar computing component capable of processing data. In the example implementation of FIG. 5, the computing component 500 includes a hardware processor 502, and machine-readable storage medium for 504.

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-516, to control processes or operations for provisioning network devices. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-516.

Hardware processor 502 may execute instruction 506 to receive a discovery message broadcast by network device. For example, gateway 230 may receive a discovery message that has been broadcasted by network device 220 that is co-located with gateway 230.

Hardware processor 502 may execute instruction 508 to send a response within identifier of the gateway. For example, gateway 230 may send response to the discovery message to network device 220. The response may include an identifier of the gateway (e.g., IP address of gateway 230). In some examples, connecting with the network device 220 may eliminate a need for network device 220 to establish an independent network connection with a cloud-based provisioning system 210 by network device 220.

Hardware processor 502 may execute instruction 510 to receive a request for configuration information from the network device. For example, gateway 230 may receive a request for configuration information from cloud-based provisioning system like provisioning system 210. The request may be directed to gateway 230 based on the identifier of gateway 230 being included in the request.

Hardware processor 502 may execute instruction 512 to send the request for configuration information to a provisioning system. For example, gateway 230 may send the request to provisioning system 210 using an existing network connection between gateway 230 and provisioning system 210.

Hardware processor 502 may execute instruction 514 to receive the configuration information from provisioning system. For example, gateway 230 may receive the configuration information from provisioning system 210.

Hardware processor 502 may execute instruction 516 to route the configuration information to the network device. For example, gateway 230 may route the configuration information to network device 220.

In some examples, gateway 230 may decrypt packets comprising the configuration information prior to routing the packets to network device 220.

In some examples, gateway 230 may receive second configuration information for a second network device from provisioning system 210, were second network device is network device 220B and the other network device is first network device 220A. Gateway 230 may decrypt packets comprising the second configuration information for network device 220B in parallel with decrypting the packets comprising the first configuration information for network device 220A. Once the packets are decrypted, gateway 230 may route the decrypted packets comprising the second configuration information to second network device 220B.

Figure 6:
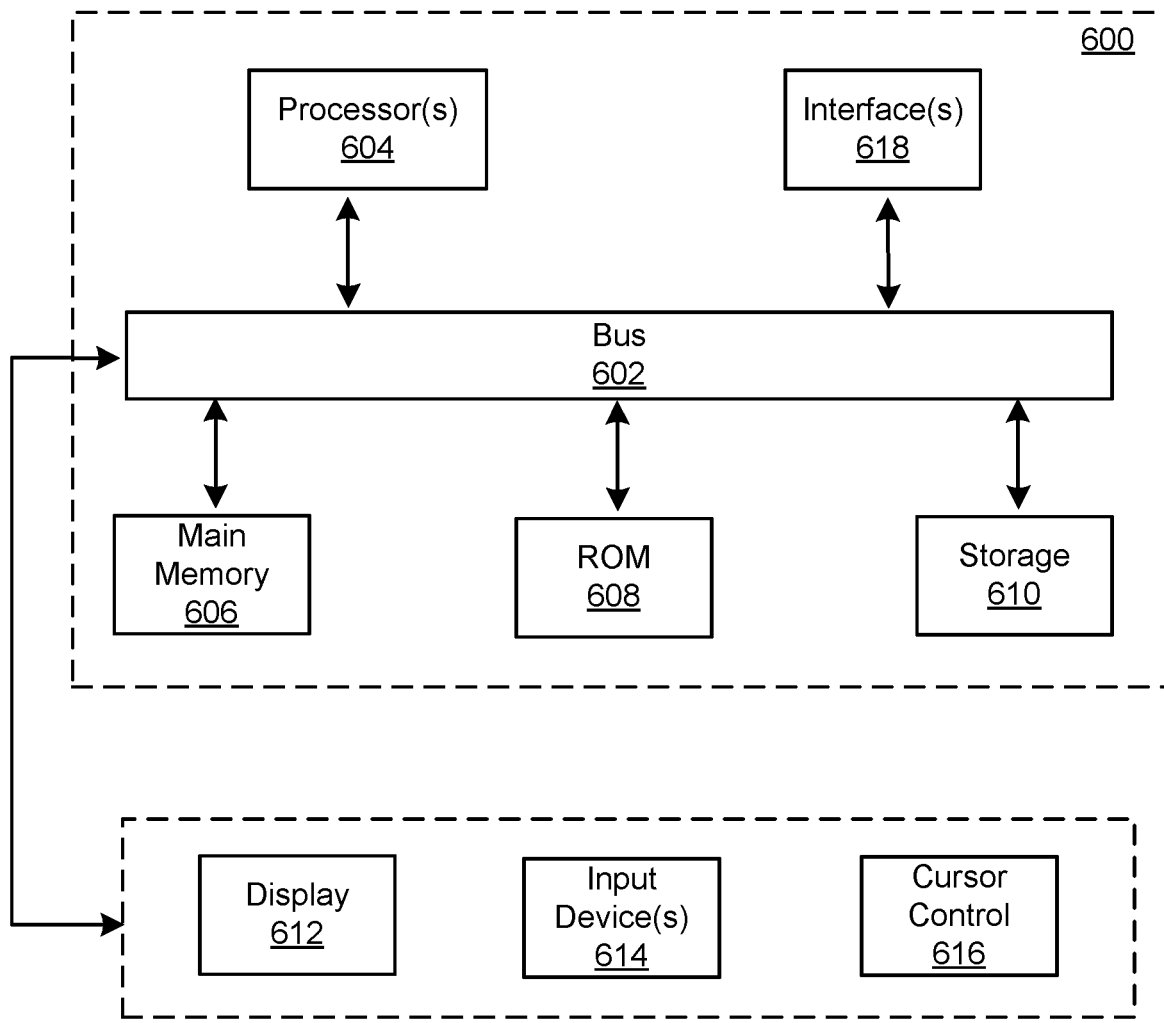
FIG. 6 depicts a block diagram of an example computer system in which various of the examples described herein may be implemented.

FIG. 6 depicts a block diagram of an example computer system 600 in which various of the examples described herein may be implemented. The example computer system 600 may correspond with any of one or more of the devices described herein, including provisioning system 110, plurality of network devices 120, and gateway 130 as illustrated in FIG. 1, provisioning system 210, plurality of network devices 220, and gateway 230 as illustrated in FIG. 2, and provisioning system 301, plurality of network devices 302, and gateway 303 as illustrated in FIG. 3. In some examples, the computer system 600 may be a combination of these devices (e.g., network device 302 and gateway 303).

The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some examples, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one example, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Communication interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A network device comprising:
   a non-transitory storage medium storing instructions; and
   one or more processors configured to access the non-transitory storage medium and execute the instructions to:
   initiate attempts to connect to a cloud-based provisioning system;
   locate a gateway by broadcasting a discovery message from the network device, wherein the gateway is co-located with the network device, wherein a network connection exists between the gateway and the cloud-based provisioning system, and wherein the gateway downloads, from the cloud-based provisioning system, a network address of the gateway responsive to the gateway establishing the network connection to the cloud-based provisioning system;

based on receiving the network address of the gateway in a response, from the gateway, to the broadcast discovery message broadcast from the network device:
    determine, at the network device, to use the network connection of the gateway to the cloud-based provisioning system, and
    refrain from establishing an independent network connection to the cloud-based provisioning system by stopping the attempts to connect to the cloud-based provisioning system;

send a request for configuration information for the network device to the cloud-based provisioning system via the network connection between the gateway and the cloud-based provisioning system; and receive the configuration information from the cloud-based provisioning system via the gateway.

2. The network device of claim 1, wherein the instructions are executable on the one or more processors further to:
associate the network device with the gateway using the network address of the gateway.

3. The network device of claim 1, wherein the received configuration information is decrypted configuration information provided by the gateway based on decrypting, at the gateway, encrypted configuration information received at the gateway from the cloud-based provisioning system.

4. The network device of claim 1, wherein the network connection between the gateway and the cloud-based provisioning system is a secure connection.

5. The network device of claim 1, wherein the network address of the gateway is an Internet Protocol (IP) address of the gateway, and wherein the instructions are executable on the one or more processors to determine to use the network connection of the gateway to the cloud-based provisioning system based on receiving the IP address of the gateway in the response to the broadcast discovery message.

6. The network device of claim 1, wherein the configuration information from the cloud-based provisioning system includes network configuration parameters.

7. The network device of claim 1, wherein the configuration information from the cloud-based provisioning system comprises a link to software, and wherein the instructions are executable on the one or more processors further to:
download, to the network device, the software using the link.

8. The network device of claim 1, wherein the instructions are executable on the one or more processors to send the request for the configuration information to the network address of the gateway.

9. A method comprising:
downloading, by a gateway comprising a hardware processor from a cloud-based provisioning system, a network address of the gateway responsive to the gateway establishing a network connection to the cloud-based provisioning system;

receiving, at the gateway, a discovery message broadcast by a network device co-located with the gateway;

sending, by the gateway, a response to the discovery message to the network device, the response including the network address of the gateway, the response causing the network device to, based on receiving the network address of the gateway in the response, determine to use the network connection of the gateway to the cloud-based provisioning system and stop a previously initiated attempt of the network device to connect to the cloud-based provisioning system;

receiving, at the gateway from the network device, a request for configuration information from the cloud-based provisioning system, wherein the request is directed to the gateway based on the network address of the gateway;

sending, by the gateway, the request to the cloud-based provisioning system using the network connection between the gateway and the cloud-based provisioning system;

receiving, at the gateway, the configuration information from the cloud-based provisioning system; and routing, by the gateway, the configuration information to the network device.

10. The method of claim 9, wherein the received configuration information is encrypted, and the method further comprising:
decrypting, at the gateway, the received configuration information to produce decrypted configuration information, wherein the routing of the configuration information to the network device comprises routing the decrypted configuration information to the network device.

11. The method of claim 10, wherein the network device is a first network device and the received configuration information is first encrypted configuration information, the method further comprising:
receiving, at the gateway from the cloud-based provisioning system, second encrypted configuration information for a second network device;
decrypting the second encrypted configuration information in parallel with decrypting the first encrypted configuration information, wherein the decrypting of the second encrypted configuration information produces second decrypted configuration information; and
routing the second decrypted configuration information from the gateway to the second network device.

12. The method of claim 9, wherein the network connection between the gateway and the cloud-based provisioning system is a secure connection.

13. The method of claim 9, wherein the network address of the gateway is an Internet Protocol (IP) address of the gateway.

14. The method of claim 9, wherein the configuration information from the cloud-based provisioning system includes network configuration parameters.

15. The method of claim 9, wherein the configuration information from the cloud-based provisioning system comprises a link to software and wherein the method further comprises:
downloading, by the network device, the software using the link.

16. The method of claim 9, wherein the discovery message is broadcast to network devices that are co-located with the network device within a threshold distance.

17. A system comprising:
a gateway to download, from a cloud-based provisioning system, a network address of the gateway responsive to the gateway establishing a network connection to the cloud-based provisioning system; and
a network device to:
    initiate an attempt to connect to the cloud-based provisioning system;
    locate the gateway by broadcasting a discovery message from the network device, wherein the gateway is co-located with the network device and the network connection exists between the gateway and the cloud-based provisioning system;

based on receiving the network address of the gateway in a response, from the gateway, to the broadcast discovery message broadcast from the network device:

determine, at the network device, to use the network connection of the gateway to the cloud-based provisioning system, and refrain from establishing an independent network connection to the cloud-based provisioning system by stopping the attempt to connect to the cloud-based provisioning system;

send a request for configuration information for the network device to the cloud-based provisioning system via the network connection between the gateway and the cloud-based provisioning system; and receive the configuration information from the cloud-based provisioning system via the gateway.

18. The system of claim 17, wherein the network device is further to:

associate the network device with the gateway using the network address of the gateway.

19. The system of claim 17, wherein the network device is to send the request for the configuration information to the network address of the gateway rather than a network address of the cloud-based provisioning system.

20. The system of claim 17, wherein the network address of the gateway is an Internet Protocol (IP) address of the gateway, and wherein the network device is to determine to use the network connection of the gateway to the cloud-based provisioning system based on receiving the IP address of the gateway in the response to the broadcast discovery message.

* * * * *